United States Patent [19]

Naarmann et al.

[11] 4,158,097
[45] Jun. 12, 1979

[54] POLYMERIZABLE COMPOUNDS CONTAINING TRIBROMOMETHYL GROUPS

[75] Inventors: Herbert Naarmann, Wattenheim; Klaus Penzien, Frankenthal, both of Fed. Rep. of Germany

[73] Assignee: BASF Aktiengesellschaft, Fed. Rep. of Germany

[21] Appl. No.: 782,613

[22] Filed: Mar. 30, 1977

Related U.S. Application Data

[63] Continuation-in-part of Ser. No. 618,629, Oct. 1, 1975, abandoned.

[30] Foreign Application Priority Data

Oct. 16, 1974 [DE] Fed. Rep. of Germany ....... 2449214

[51] Int. Cl.$^2$ .............................................. C07C 69/54
[52] U.S. Cl. .................................. 560/223; 560/218; 526/292
[58] Field of Search ................................ 560/223, 218

[56] References Cited

U.S. PATENT DOCUMENTS

| | | | |
|---|---|---|---|
| 3,165,502 | 1/1965 | Caldwell | 560/223 |
| 3,641,119 | 2/1972 | Balle' et al. | 560/223 |
| 3,882,169 | 5/1975 | Hrabak et al. | 560/223 |
| 3,974,205 | 8/1976 | Hrabak et al. | 560/223 |

OTHER PUBLICATIONS

Fieser et al., "Reagents for Organic Synthesis" vol. I (1967) p. 633.

Primary Examiner—James O. Thomas, Jr.
Assistant Examiner—L. Hendriksen
Attorney, Agent, or Firm—Keil & Witherspoon

[57] ABSTRACT

New compounds containing tribromomethyl groups, of the general formula

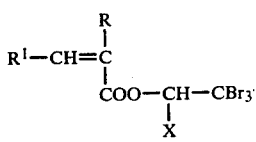

wherein X is chlorine or bromine, R is hydrogen or methyl and $R^1$ is hydrogen or a group of the formula —COO—CHX—CBr$_3$ and a process for their preparation. The compounds may be used for the manufacture of homopolymers or copolymers which find diverse uses, eg. for the manufacture of moldings, coatings or adhesives. The compounds are manufactured by reacting the corresponding acid chlorides or acid bromides with equivalent amounts of tribromoacetaldehyde. The acid chlorides and bromides have the formula

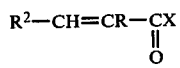

wherein X is chlorine or bromine, R is hydrogen or methyl and $R^2$ is hydrogen or —COX. The reaction is carried out in the presence of from 0.1 to 10 per cent by weight of a Lewis acid, preferably AlBr$_3$ or FeBr$_3$, at from 0 to 80° C., generally with reaction times of from 1 to 10 hours, preferably from 2 to 3 hours. The reaction is carried out without solvents or, with particular advantage, in a solution, of about 50 per cent strength, in an inert aliphatic, cycloaliphatic or aromatic solvent, eg. hexane mixtures, octane mixtures, cyclohexane or toluene. From 0.1 to 10 per cent by weight of magnesium oxide is added to the reaction mixture, prior to the distillation to achieve good yields and compound purity.

2 Claims, No Drawings

POLYMERIZABLE COMPOUNDS CONTAINING TRIBROMOMETHYL GROUPS

RELATED APPLICATIONS

The present application is a continuation-in-part of co-pending application Ser. No. 618,629, which was filed on Oct. 1, 1975 which application is now abandoned.

The invention relates to ethylenically unsaturated compounds containing tribromomethyl groups, which may be used as monomers for the manufacture of homopolymers and copolymers.

German Published application No. 2,252,908 describes the manufacture of polymers of the 1,2,2,2-tetrachloroethyl ester of acrylic acid. However, it has not hitherto proved possible to manufacture vinyl compounds, containing tribromomethyl groups, in sufficient purity for polymerization. Furthermore, in most cases high molecular weight materials were not obtainable hitherto from the conventional compounds of this type, since the powerful chain transfer action of the bromine atoms in the tribromomethyl groups resulted in compounds of relatively low molecular weight.

It is an object of the present invention to provide compounds, containing tribromomethyl groups, which can be used for the manufacture of homopolymers and copolymers. It is a further object of the invention that the compounds containing tribromomethyl groups should be capable of simple and economical manufacture, in very high yield and great purity.

We have found that this object is achieved by ethylenically unsaturated compounds, containing tribromomethyl groups, of the general formula

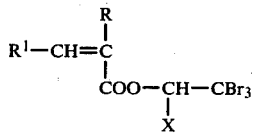

in which X is chlorine or bromine, R is hydrogen or methyl and $R^1$ is hydrogen or a group of the formula —COC—CHX—CBr$_3$.

Preferred compounds are the 1-chloro-2,2,2-tribromoethyl esters and the 1,2,2,2-tetrabromoethyl esters of acrylic acid, methacrylic acid, maleic acid and fumaric acid.

The compounds according to the invention can be manufactured by reacting the corresponding acid chlorides or acid bromides with equivalent amounts of tribromoacetaldehyde. The acid chlorides and bromides have the formula

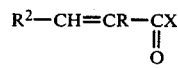

wherein X is chlorine or bromine, R is hydrogen or methyl and $R^2$ is hydrogen or —COX. The reaction is carried out in the presence of from 0.1 to 10 percent by weight of a Lewis acid, preferably AlBr$_3$ or FeBr$_3$, at from 0° to 80° C., generally with reaction times of from 1 to 10 hours, preferably from 2 to 3 hours. The reaction is carried out without solvents or, with particular advantage, in a solution, of about 50 percent strength, in an inert aliphatic, cycloaliphatic or aromatic solvent, eg. hexane mixtures, octane mixtures, cyclohexane or toluene. From 0.1 to 10 percent by weight of magnesium oxide is added to the reaction mixture, prior to the distillation to achieve good yields and compound purity. The compounds according to the invention are colorless oily liquids which can be distilled without decomposition at the reduced pressure generated by a diffusion pump, and can thus be obtained in a pure form.

If attempts are made to manufacture the compounds according to the invention, containing tribromomethyl groups, under the process conditions described in German Published application No. 2,252,908, the products are only obtained in very low yield and, in most cases, in insufficient purity. It was not foreseeable that it would be possible to manufacture these compounds in the desired purity and in satisfactory yield by using the process conditions according to the invention. It is equally surprising that the compounds according to the invention can be polymerized to high molecular weight substances, in spite of the known chain transfer effect and regulating effect of the bromine atoms in the tribomomethyl groups. To obtain the high molecular weight substances, the compounds containing —CBr$_3$ groups are polymerized, if desired together with other olefinically unsaturated monomers, in accordance with the conventional rulse for the free radical polymerization of vinyl monomers.

Suitable olefinically unsaturated comonomers are olefins, such as ethylene, butadiene, isoprene, styrene and substituted styrenes, such as α-methylstryrene, p-chlorostyrene and p-methylstyrene, acrylic acid esters and methacrylic acid esters derived from alcohols of 1 to 18 carbon atoms, preferably of 1 to 8 carbon atoms, for example acrylic or methacrylic acid esters of methanol, ethanol, butanol or ethylcyclohexanol, acrylamide and methacrylamide and the corresponding N-substituted amides, such as N-methylolacrylamide, N-methylolmethacrylamide and their ethers, such as N-methylolacrylamide butyl ether and N-methylolmethacrylamide methyl ether, acrylonitrile and methacrylonitrile, vinyl esters, such as vinyl acetate and vinyl propionate, vinyl ethers, such as methyl vinyl ether, ethyl vinyl ether or alkyl vinyl ethers wherein alkyl is of 3 to 6 carbon atoms, and also fumaric, maleic acid or itaconic acid and esters and anhydrides of these acids. It is also possible simultaneously to copolymerize 2 or more of the above compounds with the compounds containing tribromomethyl groups.

To manufacture the copolymers, the proportion of compounds, containing tribromomethyl groups, in the monomer mixture may vary within wide limits, eg. from 1 to 99 percent by weight and especially from 10 to 90 percent by weight.

Conventional initiators which form free radicals are used to initiate the polymerization. Examples of suitable initiators are hydrogen peroxide, organic hydroperoxides and peroxides, eg. caproyl peroxide, lauroyl peroxide, tert.-buty-perbenzoates, dicumyl peroxide, p-methane hydroperoxide and cumene hydroperoxide as well as aliphatic azo compounds which decompose into free radical under the polymerization conditions, such as 2,2'-azo-bis-2,4-dimethylvaleronitrile, 2,2'-azo-bis-isobutyronitrile and analogous azonitriles, such as are listed, eg., in J. Hine, "Reaktivität und Mechanismus in der organischen Chemie", published by Georg Thieme, Stuttgart (1960), page 412, as well as conventional Redox catalyst systems, eg. the systems comprising potassium persulfate or ammonium persulfate and ascorbic acid, sodium bisulfate or iron-II salts.

Furthermore, the chelates of transition metals known to form free radicals may be used, particularly those in which the metal has an unusual valency, eg. chelates of manganese-(III), cobalt-(III), copper-(II) and cerium-(IV). In general, 1,3-di-carbonyl compounds are used to form the chelates. Examples of the chelates are maganese-(III) acetylacetonate and the cobalt-(III) chelate of ethyl acetoacetate.

In general, from 0.05 to 5 percent by weight, based on monomer, of the initiator are used. The optimum amount, and the most effective initiator, may readily be established by experiments.

The polymerization can be carried out in bulk, but is advantageously carried out in the presence of solvents or diluents. Examples of very suitable solvents or diluents are alcohols, eg. methanol, ethanol, propanol or butanol, ketones, eg. methyl ethyl ketone or methyl propyl ketone, ethers, eg. tetrahydrofuran or dioxane, aliphatic, cycloaliphatic or aromatic hydrocarbons, eg. heptane, hexane, cyclohexane or benzene, and formamide and dimethylformamide. In many cases it is particularly advantageous to use water as the diluent.

The suspension polymerization, solution polymerization or emulsion polymerization processes conventionally used with other monomers are also applicable to the compounds containing tribromomethyl groups. The assistants which may be used in the polymerization process, e.g. buffers, dispersing agents, protective colloids and the like, are also the same as those used in conventional processes.

The polymerization may be carried out within a broad temperature range, from about 0° to 150° C., preferably from 50° to 120° C. In general, the polymerization is carried out under atmospheric pressure, but lower or higher pressures, eg. up to 3,000 atmospheres, may also be used. When using low-boiling comonomers, in particular, superatmospheric pressures are used to ensure an adequate concentration of the comonomer in the reaction mixture.

The copolymerization of the unsaturated compounds with ethylene or butadiene can advantageously be carried out in emulsion by introducing the copolymerizable monomers into an aqueous soap emulsion which contain an initiator, a buffer system and, if appropriate, a protective colloid, and carrying out the polymerization at superatmospheric pressure. The copolymerization with acrylic acid esters is suitably carried out in aromatic or aliphatic hydrocarbons under the conditions known for the polymerization of acrylic acid esters.

Examples of the uses of the polymers, if appropriate mixed with other plastics, e.g. with polyethylene, polypropylene or copolymers of ethylene and vinyl acetate, are the manufacture of moldings, coatings or adhesives. Such products are flameproof. Because of their surface-active properties, the polymers manufactured according to the invention may also be used, inter alia, for finishing paper and textiles, and permit further secondary reactions to take place via the tribromomethyl groups.

In the Examples, parts and percentages are by weight. The K values are a measure of the mean molecular weight and were determined in 1 percent strength solution in dimethylformamide by the method of H. Fikentscher, described in "Cellulosechemie" 13, (1932), page 58.

EXAMPLE 1

1 part of anhydrous iron-III chloride is added carefully in portions, in the course of 10 minutes, to 90.5 parts of acrylic acid chloride, 281 parts of tribromoacetaldehyde and 200 parts of benzene. The heat of reaction is conducted away by cooling with ice so that the temperature in the reaction vessel does not exceed 70° C. The mixture is then stirred for 4 hours at 70° C., after which 2 parts of magnesium oxide are added. The benzene solution is concentrated and the residue is distilled at from 0.1 to 0.2 mm Hg and from 77° to 81° C. through a 20 cm column (containing 5 mm Raschig rings). 265 parts of the 1-chloro-2,2,2-tribromoethyl ester of acrylic acid are obtained, corresponding to a yield of 71.4%. The product contains 64.4% of bromine (theoretical content 64.6%).

EXAMPLE 2

10.0 parts of the ester $CH_2=CH-COO-CHCl-CBr_3$, manufactured in Example 1, in 90 parts of benzene and 0.1 part of azobisisobutyronitrile are heated at 60° C. for 4 hours under nitrogen, whilst stirring. After stripping off the benzene, washing the residue with methanol and drying, 9.0 parts of a polymer are obtained, which has a K value of 92.6, a glass transition temperature $T_G$ of +63° C. and a refractive index $n_D^{20}$ of 1.5293.

EXAMPLES 3 TO 13

25.3 parts of aluminum bromide are added in the course of 10 minutes, at 0° C., to 104.5 parts of methacrylic acid chloride, the equimolar amount of tribromoacetaldehyde and 200 parts of benzene. The temperature rises to 10° C., and the mixture is cooled with ice. 300 parts of benzene are then added and the reaction solution is stirred for 6 hours and then heated to 30° C., and worked up analogously to Example 1, i.e. in the presence of magnesium oxide. The 1-chloro-2,2,2-tribromoethyl ester of methacrylic acid is obtained in 45.4 percent yield. The product contains 62.1% of bromine (theoretical content 62.3%).

This ester and ethyl acrylate are mixed in the ratios shown in Table 1, and after addition of 0.1% of azobisisobutyronitrile each mixture is heated, in the presence of 100 parts of benzene, at 70° C. for 2 hours. After removing the benzene in a rotary evaporator, the copolymers are dried for 10 hours in a vacuum drying oven at 60° C. and 12 mm Hg. The results are shown in Table 1.

TABLE 1

| No. | Ethyl acrylate parts | $-CB_3$ derivative parts | Conversion % | K value | Proportion of the bromine derivative in the copolymer, in % by weight |
|---|---|---|---|---|---|
| 3 | 9.9 | 0.1 | 90.0 | 76.5 | 1.0 |
| 4 | 9.5 | 0.5 | 86.5 | 86.5 | 4.5 |
| 5 | 9.0 | 1.0 | 87.0 | 83.0 | 8.9 |
| 6 | 8.5 | 1.5 | 87.0 | 84.0 | 14.1 |
| 7 | 8.0 | 2.0 | 87.5 | 81.0 | 18.2 |
| 8 | 7.0 | 3.0 | 88.0 | 89.5 | 27.7 |
| 9 | 6.0 | 4.0 | 92.0 | 88.5 | 37.4 |
| 10 | 5.0 | 5.0 | 94.5 | 88.0 | 44.7 |
| 11 | 4.0 | 6.0 | 98.0 | 88.0 | 51.2 |
| 12 | 2.5 | 7.5 | 97.5 | 88.0 | 70.1 |
| 13 | 1.0 | 9.0 | 99.5 | 90.0 | 81.0 |

EXAMPLES 14 TO 17

If the procedure described in Example 10 is followed but one of the compounds shown below is used as the —CBr₃ compound, the results shown in Table 2 are obtained.

TABLE 2

| No. | K value | T_G°C. | Type |
|---|---|---|---|
| 14 | 76 | +88 | $CH_2=C(CH_3)-COO-CHBr-CBr_3$ |
| 15 | 43.5 | +26 | $\underbrace{ROOC-CH=CH-COO-CHCl-CBr_3}_{=R}$ |
| 16 | 34 | +33 | $ROOC-CH=CH-COOCHCl-CBr_3$ |
| 17 | 78 | +70.5 | $CH_2=CH-COOCHBr-CBr_3$ |

EXAMPLE 18 TO 21

If the procedure described in Example 2 is followed but in addition one or more comonomers are used, the results shown below are obtained (Table 3).

TABLE 3

| No. | K value | T_G °C | Comonomers Type | Amount |
|---|---|---|---|---|
| 18 | 34 | +68 | styrene | 10 parts |
| 19 | 43 | +88 | styrene/ | 70 parts |
| 20 | 65 | −11 | acrylic acid | 20 parts |
|  |  |  | n-butyl acrylate | 10 parts |
| 21 | 69 | +64 | acrylonitrile | 5 parts |

We claim:

1. In a process for the manufacture of compounds containing tribromomethyl groups of the formula

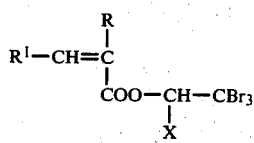

$$R^1-CH=C\underset{X}{\overset{R}{\underset{|}{\overset{|}{C}}}}-COO-CH-CBr_3$$

in which X is chlorine or bromine, R is hydrogen or methyl and R¹ is hydrogen or a group of the formula —COO—CHX—CBr₃ by reacting unsaturated acid halides of the formula $$R^2-CH=CR-COX$$

in which X is chlorine or bromine, R is hydrogen or methyl and R² is hydrogen or —COX, with equivalent amounts of tribromoacetaldehyde without solvents or in a solution of inert aliphatic, cycloaliphatic or aromatic solvents, in the presence of a Lewis acid selected from the group consisting of AlBr₃, FeBr₃ and FeCl₃, at a temperature of from 0° to 80° C. with subsequent distillation of the reaction product, the improvement comprising: adding to the reaction mixture from about 0.1 to 10% by weight of magnesium oxide prior to the distillation.

2. A process as set forth in claim 1 wherein said Lewis acid is iron (III) chloride.

* * * * *